United States Patent [19]
Carlson et al.

[11] Patent Number: 4,896,754
[45] Date of Patent: Jan. 30, 1990

[54] ELECTRORHEOLOGICAL FLUID FORCE TRANSMISSION AND CONVERSION DEVICE

[75] Inventors: J. David Carlson, Cary; Theodore G. Duclos, Raleigh, both of N.C.

[73] Assignee: Lord Corporation, Erie, Pa.

[21] Appl. No.: 236,433

[22] Filed: Aug. 25, 1988

[51] Int. Cl.[4] .......................................... F16D 27/00
[52] U.S. Cl. .............................. 192/21.5; 192/84 E; 192/84 PM; 192/103 F; 188/267; 464/24
[58] Field of Search .............. 192/21.5, 84 E, 84 PM, 192/103 F; 188/267; 464/29

[56] References Cited

U.S. PATENT DOCUMENTS

| | | | |
|---|---|---|---|
| 2,417,850 | 3/1947 | Winslow | 175/320 |
| 2,575,360 | 11/1951 | Rainbow | 192/21.5 |
| 2,612,248 | 9/1952 | Feifertag | 192/84 PM |
| 2,622,713 | 12/1952 | Rabinow | 192/21.5 |
| 2,663,809 | 12/1953 | Winslow | 310/78 |
| 2,709,507 | 5/1955 | Trickey | 192/21.5 |
| 2,762,248 | 9/1956 | Necson | 192/21.5 |
| 2,773,206 | 12/1956 | Zozulin et al. | 192/84 PM |
| 2,886,151 | 5/1959 | Winslow | 192/21.5 |
| 2,956,658 | 10/1960 | Jaeschke | 192/84 PM |
| 2,983,349 | 5/1961 | Meiklejohn | 192/21.5 |
| 3,085,407 | 4/1963 | Tomlinson | 192/84 PM |
| 3,250,341 | 5/1966 | Takahashi | 180/77 |
| 4,065,234 | 12/1977 | Yoshiyuki et al. | 192/84 PM |
| 4,664,236 | 5/1987 | Stangroom | 192/35 |
| 4,772,407 | 9/1988 | Carlson | 192/21.5 |

FOREIGN PATENT DOCUMENTS 2083595B 1/1985 United Kingdom .

*Primary Examiner*—Rodney H. Bonck
*Assistant Examiner*—Nicholas Whitelaw
*Attorney, Agent, or Firm*—David L. McCombs

[57] ABSTRACT

An electrorheological fluid torque transmission and conversion system provides for variable control of torque in clutch and brake applications. Communication of mechanical energy between the drive elements is accomplished by magnetic coupling to eliminate the need for a dynamic fluid seal for interface of moving parts to the interior portion of the electrorheological fluid containment chamber. Permanent magnets are associated respectively with each of a first member and a second member which are magnetically coupled through a surface with low magnetic permeability such that the first member and second members rotate in unison. A variety of permanent arrangements may be utilized. Further, the drive element internal to the electrorheological fluid chamber may be both mechanically and electrically decoupled. A floating electrode may be capacitively coupled through the fluid to the power supply. Also provided are inner and outer conductive plates are provided for increased fluid surface contact area. Spacing between the inner and outer plates is determined by the thickness of inner and outer ring members therebetween, which may be easily removed and replaced for simplified assembly and adjustment. Condition responsive control of the electrorheological fluid torque transmission and conversion system is provided by closed-loop feedback of a signal indicative of rotational speed between the drive elements to the control system. The control system may also incorporate internal power generation to provide a self-contained system which does not require an external power source.

25 Claims, 7 Drawing Sheets

ELECTRORHEOLOGICAL FLUID FORCE TRANSMISSION AND CONVERSION DEVICE

BACKGROUND OF THE INVENTION

The present invention relates generally to an electrorheological (ER) fluid force transmission and conversion device and more particularly provides an improved ER fluid clutch or brake in which the ER fluid is isolated within a working chamber and torque transmission to the output is accomplished by magnetic coupling to eliminate the need for a dynamic fluid seal. Self-contained power generation may also be accomplished to provide the required electric field for modulation of fluid yield strength caused by the ER effect.

Significant progress has been made in the development of low cost, reliable electrorheological fluids. In general, ER fluids consist of suspensions of very fine particles in a dielectric liquid media. Such fluids were first referred to as "electroviscous" because of their apparent viscosity changes in the presence of an electric field. A better understanding of these types of compositions has revealed that the phenomenon being observed is a change in the minimum stress required to induce shear of the fluid, while the actual viscosity remains generally constant. Accordingly, these effects are better described in terms of the total rheology of the composition, and as such are now more commonly referred to as "electrorheological" fluids. In the absence of an electric field, ER fluids exhibit Newtonian flow characteristics; their shear rate is directly proportional to shear stress. However, when an electric field on the order of $10^3$ volts per millimeter is applied, a yield stress phenomenon occurs such that no shearing takes place until the shear stress exceeds a yield value which rises with increasing electric field strength. This result can appear as an increase in apparent viscosity of several orders of magnitude.

Commercially realizable systems employing these fluids include variable clutch or brake assemblies. Early torque transmission systems departing from traditional mechanical clutch and brake assemblies utilized magnetic particles suspended in a liquid to offer the possibility of progressive control of the torque in response to the magnetic field applied. The application of a magnetic field cause the magnetic particles to adhere to one another between the mechanical drive elements and therefore varies the frictional force between them. However, the power required to generate an appropriate magnetic field and the physical size of the components needed for these devices present significant limitations on the ability to transmit torque.

Electric field responsive torque transmitting devices which take advantage of the ER effect possess the considerable advantage of very rapid response to changes in the applied field, previously unobtainable with magnetic fluid devices. Electric field responsive devices also may be constructed without heavy and expensive electromagnetic coils. As in U.S. Pat. No. 2,417,850, 2,886,151 and 4,664,236, disclose illustrative ER fluid clutch and brake mechanisms that offer the possibility of progressive and continuous control of torque in response to variation in the electric field across the fluid. Electrorheological fluids as applied to the development of mechanical system of this nature offer the potential for providing rapid and reversible response characteristics, with typical response times being on the order of one millisecond.

While ER fluid torque transmission devices provide for variable and responsive control superior to conventional viscous shear and other clutches as well as magnetic fluid arrangements, existing ER fluid torque transmission devices have heretofore been less than ideal. The torque limits of ER fluid devices are constrained by voltage potential and interactive surface area for ER fluid shear. Efforts to maximize the interactive surface area while maintaining the overall volume of the device to a minimum have not been entirely satisfactory, especially in view of cost prohibitive and inefficient manufacturing and assembly alternatives.

Typically, clutches require reliable performance under adverse and often unpredictable conditions of vibration, impact and other adverse conditions. Isolation or containment of the ER fluid within the system is problematic under such conditions especially in view of the dynamics of assembly components. The problem of maintaining system integrity without fluid leakage is exacerbated by temperature and pressure extremes experienced under normal working conditions. Other inherent shortcomings of existing systems include the need for responsive control. In order to take full advantage of instantaneous variability in ER fluid shear strength, command of electric field potential must be contemporaneously responsive to the system state and changing torque requirements. Further, an external power source or battery for supply of electrical energy to the system has in the past been required. An electric potential on the order of $10^3$ volts is typically required to create the electric field for implementation of the ER effect. The power requirements mentioned may limit the effectiveness of such devices for self-contained application.

It is accordingly an object of the present invention to provide an ER fluid torque transmission and conversion device which eliminates or substantially minimizes the above mentioned and other problems and limitations typically associated with ER fluid clutch and brake assemblies.

SUMMARY OF THE INVENTION

The present invention provides an improved electrorheological fluid torque transmission and conversion system for variable control of torque in clutch and brake applications. In lieu of a dynamic fluid seal, such as is normally required for the mechanical interface of moving parts to the interior portion of the electrorheological fluid containment chamber, magnetic coupling means is provided. The use of magnetic coupling means eliminates undesirable leakage of fluid which can be attributed to operation under conditions of extreme vibration, temperature and pressure. Of particular importance to electrorheological fluid application technology is that the present invention can accommodate the use of chemically aggressive or abrasive fluids which historically have not been well suited to applications of the present type. The present invention also provides benefits of torsional compliance due to the use of magnetic coupling.

In accordance with another aspect of the present invention, condition responsive control of the electrorheological fluid torque transmission and conversion system is provided by closed-loop feedback of a signal indicative of rotational speed between the drive elements to a control system. The control system monitors the motion condition and selectively provides high voltage of variable magnitude to adjust the yield strength of the electrorheological fluid. The control system may incorporate internal power generation to provide a self-contained system that does not require an external power source.

In carrying out principles of the present invention, in accordance with a preferred embodiment thereof, an ER fluid clutch or brake is provided which is responsive to selective and variable application of an electric field to the ER fluid. A first member is positioned within and moveable relative to a fully enclosed electrorheological fluid chamber. Torque may be transmitted by the ER fluid through the first member. The amount of torque is determined by the particular yield strength of the fluid, which is in turn determined by the magnitude of the electric field. A second member is positioned externally from the enclosed chamber and is located in close proximity to a suface of low magnetic permeability of the enclosed chamber. Permanent magnets are associated respectively with each of the first member and the second member and are magnetically coupled through the magnetically permeable surface of the enclosed chamber such that the first member and second member rotate in unison. A plurality of permanent magnets may be associated with each of the first and the second members and coupled through the permeable surface of the enclosed chamber about the radial perimeter of internal and external magnet housings. For additional magnetic field strength and containment of magnetic flux, a magnetically conductive ring may be positioned behind the magnets on each of the external and internal magnet housings, and the permanent magnets on each may be paired.

Friction caused by magnetic coupling across the magnetically permeable wall of the enclosed chamber may be reduced by thrust bearings on each of the external or internal magnet housings at the point of engagement. Repulsive permanent magnets may also be situated about the axis of rotation on each of the external and internal magnet housings to provide reduced friction at the point of rotation.

To increase the surface area of engagement between the drive elements, alternately interspaced inner and outer conductive plates are provided within the enclosed ER fluid chamber. The coupling or gripping effect of the ER fluid is varied, by variation of its yield strength, to vary the torque transmission and conversion between the drive elements. The inner plates are connected to the internal magnet housing and rotate in unison with the external magnet housing to an input or output shaft. The outer conducting plates are operatively connected to the outer portion of the enclosed chamber and for clutch applications may be connected to an input or output shaft. Because increased temperature and pressure build-up within the enclosed chamber may be caused by the relative motion of the moving plates therein or by other environmental conditions, fluid expansion chambers are provided within the enclosed chamber to effectively provide for variable volume without the development of air pockets at low temperature and pressure.

The distance or spacing between the inner and outer conductive plates is determined by the thickness of inner and outer ring members therebetween. The ring members and inner and outer conductive plates may be easily removed and replaced for greatly simplified assembly and adjustment of distance between plate members. Access to the enclosed chamber and internal components is achieved by removal of the back plate of the housing.

A tachometer assembly provides a direct mechanical output for monitoring the motion condition of the drive elements. The tachometer is connected to a variable speed transducer to provide the electronic signals for operating the control system for direct loop feedback of high voltage to the electrorheological fluid. Programmed or selected control may be utilized to supply power from an external source or battery to create the electric field. Alternatively, high voltage gain may be accomplished from a signal transducer or generator for providing self-contained generation of power to drive the system.

Magnetic decoupling caused by unusual loads or rotational impulses is automatically rectified in an embodiment of the present invention incorporating a failsafe brake means. The external magnet housing is biased by a disc spring away from the magnetically permeable wall of the enclosed chamber and opposing permanent magnets of the internal magnet housing. Upon decoupling, the external magnet housing is biased against a plurality of brake pads to reduce rotational motion. As annular velocity decreases, the permanent magnets again orient themselves properly for engagement and recoupling is restored.

In an alternative embodiment of the present invention, magnetic coupling may be accomplished using multiple pole annular magnets which are intersleeved. A magnetically permeable surface or wall of the enclosed chamber is disposed between the permanent magnets to insure containment of the electrorheological fluid. The high voltage electrode for the system may be provided to the axis of rotation of a shaft member by a spring loaded contact point. In addition to an intersleeved annular multiple pole magnet arrangement, multiple pole magnets may be oriented in an opposing manner to accomplish magnetic coupling.

According to a further embodiment of the present invention, the drive element internal to the enclosed electrorheological fluid chamber may be both mechanically and electrically decoupled. Where it is undesirable to electrically connect an internal drive element by electrical rotational contact or other hard wire means, a floating electrode may be capacitively coupled through the electrorheological fluid to the power supply. Elecrical connections are made to the outer housing of the enclosed chamber which is divided into two parts by insulating spacers. The drive element within the enclosed chamber acts as a floating electrode to transmit the electric field across the electrorheological fluid at an electric potential equal to approximately one-half the applied voltage.

Compared to electrorheological fluid clutch and brake assemblies of conventional construction, the present invention provides a variable ER fluid torque transmission and conversion system that may be applied to a wide variety of applications. Magnetic coupling offers the ability to utilize a broader range of electrorheological fluids with greater reliability and reduced system failure. A wholly contained ER fluid clutch or brake may be provided without the need for system support or maintenance. A system employing principles of the present invention may also be easily and inexpensively constructed, assembled and manufactured for different applications.

BRIEF DESCRIPTION OF THE DRAWINGS

For a better understanding of the invention, reference may be made to the following description of exemplary embodiments, taken in conjunction with the figures of the accompanying drawings, in which.

DESCRIPTION OF THE PREFERRED EMBODIMENTS

Figure 1:
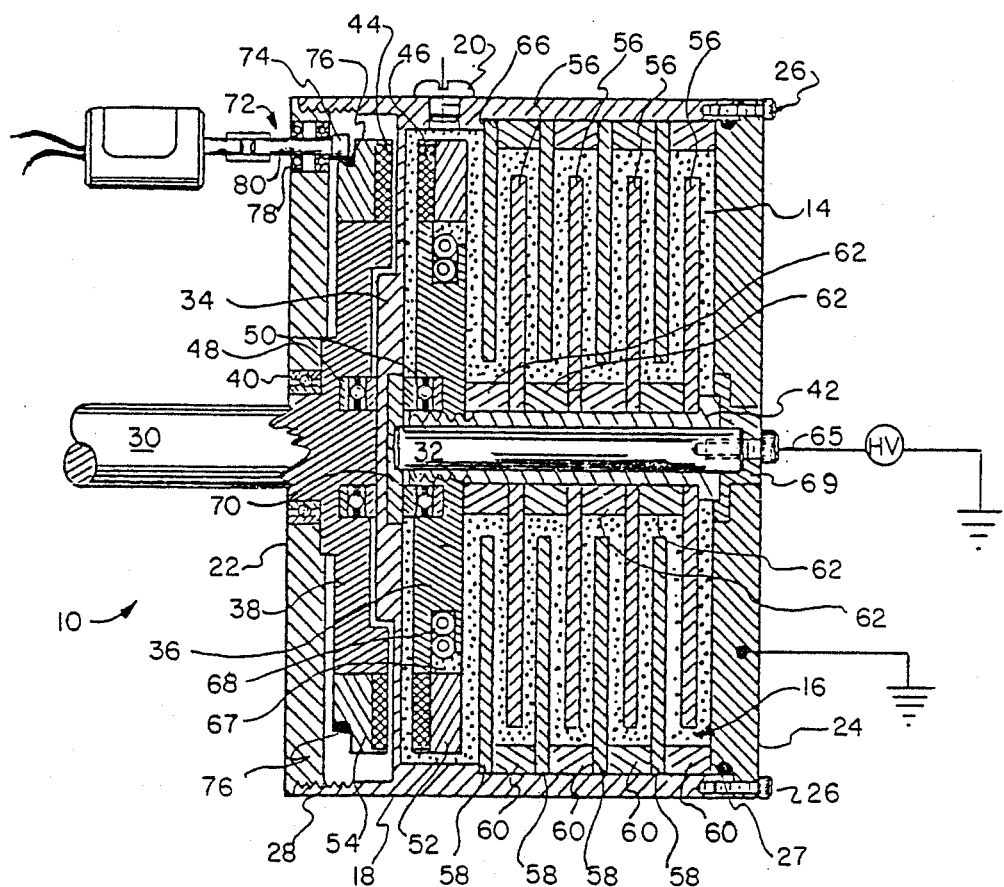
FIG. 1 is a partial cross-sectional side elevation view of an ER fluid force transmission and conversion device according to the present invention.

Referring now to the Drawings, FIG. 1 illustrates an ER fluid torque transmission and conversion device 10 which embodies principles of the present invention. The torque transmission and conversion device 10 may be operated as either a clutch or brake to provide substantially instantaneously variable control of torque for a variety of applications. Condition responsive control of device 10 is provided by closed-loop feedback of a signal indicative of rotational speed of the system to the control circuit 12a or 12b of FIGS. 3 and 4. An electrorheological fluid conceptually indicated by particles 14 and having a yield strength which varies as a function of electric field, provides the interactive medium between the moving components of device 10.

As discussed heretofore, known ER fluid clutch or brake assemblies, while possessing significant advantages over existing friction plate and electromagnetic clutches, are limited in their performance, reliability and manufacturability. A particular problem with known ER fluid clutch or brake assembles is the proclivity for dynamic fluid seal leakage which can be caused by, among other things fluid temperature and pressure variations under normal operating conditions. Attempts to overcome these and other problems by complex mechanical design alternatives have proven less than satisfactory.

The ER fluid torque transmission and conversion system of the present invention overcomes the significant limitations of known prior art ER fluid clutches or brakes. The electrorheological fluid is wholly contained within an enclosed chamber eliminating the need for fluid seal interface with any moving components. Connection of the drive elements by magnetic coupling, along with a unique ER fluid interface plate assembly provides for a compact, versatile system. It is contemplated that the concepts herein may well be employed in a variety of variable ER fluid clutch or brake devices with improved results to provide systems which are durable and may be manufactured readily.

Figure 2:
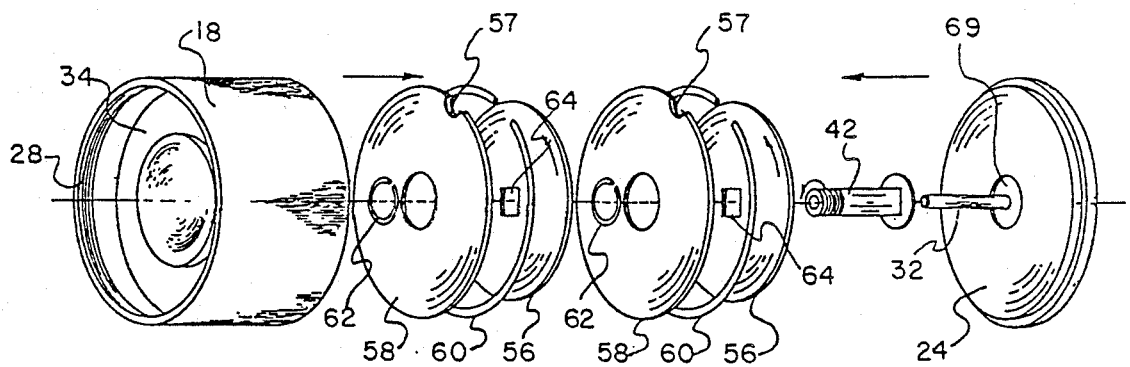
FIG. 2 is a reduced scale exploded side perspective view of components of the ER fluid force transmission and conversion device illustrated in FIG. 1, showing the assembly of inner and outer plate members for incorporation into the enclosed ER fluid chamber.
Figure 5:
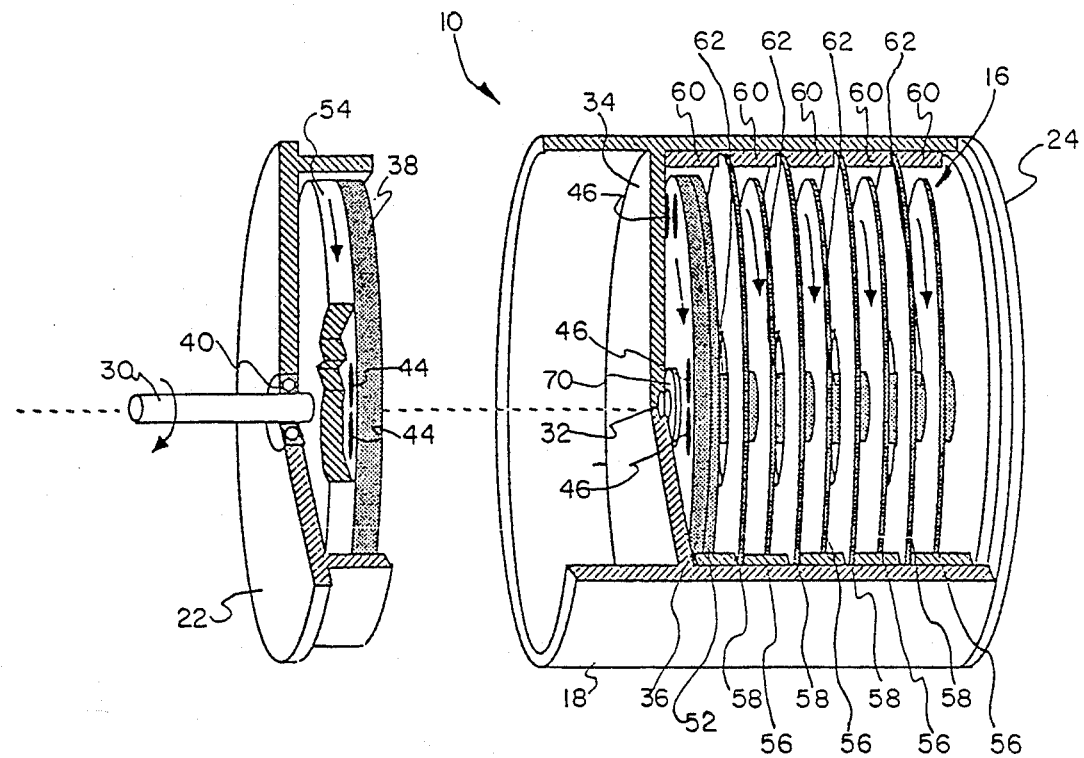
FIG. 5 is a partially enlarged exploded and broken away side perspective view of the ER fluid torque transmission and conversion device of FIG. 1, showing the magnetic coupling means and the arrangement of inner and outer plate members within the enclosed ER fluid chamber.

Referring once again the Drawings, and in particular FIGS. 1, 2 and 5, the ER fluid torque transmission and conversion device 10 employs an electrorheological fluid within an enclosed chamber 16 to variably control the transmission of torque between drive elements. Any type of electrorheological fluid may be used depending on the particular yield stress, power and other requirements associated with the contemplated application. Abrasive or chemically aggressive fluids may also be used without concern for degradation over time of fluid seal components. Containment within chamber 16 of the electrorheological fluid represented by particles 14 eliminates the need for a fluid seal interface between moving components of the system. Chamber 16 is partially defined by a housing 18 which also serves to secure additional load bearing components of device 10 which will be discussed subsequently in detail. Preferably, housing 18 is constructed of sturdy, magnetically permeable rigid material such as aluminum or plastic. Composite and other materials may also be used. Part of the material of housing 18 may be expandable to accommodate temperature variations and pressure. While housing 18 is shown as generally cylindrical, alternative arrangements may include a wide variety of sizes and geometries depending upon the particular application. Communication with enclosed chamber 16 is accomplished through fill port 20, for easy addition or removal of fluid therefrom. As will be discussed subsequently, housing 18 also serves as a ground electrode for supplying a voltage potential across the electrorheological fluid.

Secured to housing 18 is front plate 22 and back plate 24 for support and containment of the drive and other components of system 10. Back plate 24 provides a wall of containment for the enclosed chamber 16 and is secured to housing 18 by a plurality of cap screws 26 (FIG. 1). An O-ring 27 or other suitable means is provided for a static seal between enclosed chamber 16 and back plate 24. Front plate 22 is engaged with housing 18 by mating threads 28. Either of front plate 22 or back plate 24 may be secured to housing 18 by alternative means, or cast with housing 18; however, easy removal is deemed advantageous from the standpoint of assembly and service access.

Device 10 is used as either a clutch or a brake for torque transmission and conversion. To this end, outer shaft 30 may be used for either input or output of rotational mechanical energy. Complimentary input or output is transmitted between the outer shaft 30 and a center shaft 32, subject to controlled variable torque transmission therebetween as will be discussed. In the case where device 10 is being utilized as a brake, torque transmission occurs between outer shaft 30 and housing 18 to which center shaft 32 is secured, the housing 18 being fixed stationary to accomplish a braking function. Utilized as a dual-shaft clutch, center shaft 32 may project outwardly from back plate 24 in a manner consistent with the particular application. A second shaft may be secured to the housing or the housing may be the shaft. Those skilled in the art will appreciate that outer shaft 30, center shaft 32 and housing 18 are merely representative of possible drive elements, and that alternative arrangements may be contemplated within the teachings of the present invention.

In order to effect engagement of the drive elements without interfering with the integrity of the enclosed chamber 16, magnetic coupling is accomplished through wall 34 of chamber 16 between an internal magnet housing 36 and an external magnet housing 38. (FIGS. 1 and 5). External magnet housing 38 is operatively connected to outer shaft 30 for rotation in conjunction therewith. A plurality of rotational ball bearings 40 facilitate the rotation of outer shaft 30 and external magnet housing 38 about the central axis of front plate 22. Internal magnet housing 36 is connected to sleeve member 42 (FIG. 1) for free rotation about the center shaft 32. The plurality of permanent magnets 44 situated about the radial perimeter of external magnet housing 38 are attractively poled and oriented in proximity to corresponding permanent magnets 46 of internal magnet housing 36, such that the magnetic coupling which occurs therebetween through wall 34 requires internal magnet housing 36 and housing 38 about the central axis of front plate 22. Internal magnet housing 36 is connected to sleeve member 42 (FIG. 1) for free rotation about the center shaft 32. The plurality of permanent magnets 44 situated about the radial perimeter of external magnet housing 38 are attractively poled and oriented in proximity to corresponding permanent magnets 46 of internal magnet housing 36, such that the magnetic coupling which occurs therebetween through wall 34 requires internal magnet housing 36 and external magnet housing 38 to rotate together. Wall 34 is a low magnetic permeability and of reduced thickness in the region of magnetic coupling to maximize the magnetically attractive forces between permanent magnets 44 and 46. Because the magnetic attraction between permanent magnets 44 and 46 will cause the internal magnet housing 36 and external magnet housing 38 to experience an axial force or load, outer thrust bearing 48 and inner thrust bearings 50 serve to permit free rotation of external magnet housing 38 and internal magnet housing 36, respectively, with reduced friction.

The arrangement of permanent magnets 44 and 46 about the radial perimeter of internal magnet housing 36 and external magnet housing 38 serves to maximize the twisting force or torque required to decouple the magnets (FIG. 5). The breakaway force of magnetic coupling is further edified by the provision of magnetic conducting rings 52 and 54 (FIGS. 1, 5-8) oriented beneath permanent magnets 44 and 46 and forming a portion of, respectively, internal magnet housing 36 and external magnet housing 38. Magnetic conducting rings 52 and 54 are constructed of a magnetically conducting metal to concentrate the permanent magnet lines of flux for increased magnetic field strength and coupling force between the opposing permanent magnets 44 and 46. The plurality of permanent magnets 44 and 46 may also be positioned in pairs about the internal magnet housing 36 and external magnet housing 38 in order to further concentrate and focus the magnetic field between the opposing magnets through wall 34 (See FIG. 8). While this arrangement of permanent magnets 44 and 46 is shown in FIGS. 1, and 5-8 as one alternative to maximize magnetic coupling between internal magnet housing 36 and 38, a variety of other magnet arrangements which accomplish magnetic coupling may also be contemplated by those skilled in the art. Alternative magnet sizes and configurations may be desired depending upon the particular application.

Transmission and conversion of torque in device 10 is accomplished by the gripping effect of the electrorheological fluid between inner plates 56 and outer plates 58. Inner plates 56 are operatively connected to and rotate with sleeve member 42. Sleeve member 42 is connected to internal magnet housing 36, and through magnetic coupling, rotates in unison with the outer shaft 30. The outer plates 58 are secured to the housing 18 and remain fixed therewith. The plurality of inner plates 56 and outer plates 58 are alternately interspaced to provide a maximized surface contact area between the plates and the electrorheological fluid. Plate thickness is usually on the order of 0.5 millimeters, with a spacing distance of approximately 1.0 millimeter. Of course, alternative plate thicknesses and spacing distances may be chosen as desired. Communication of fluid within chamber 16 between the plates is facilitated by holes or scallops 57 in outer plates 58.

As depicted in FIGS. 1 and 2, the spacing between inner plates 56 and outer plates 58 may be easily determined and varied. The spacing between the outer plates 58 is determined by the thickness of outer ring members 60, while the spacing between inner plates 56 is determined by inner ring members 62. During assembly, the ring member and plate members are alternately positioned within housing 18. Notches 64 mate with sleeve members 42 to secure inner plates 56 in place and prevent free rotation. Outer plates 58 are secured against undesirable rotation by their compression against annular lip 66 of the housing 18 by back plate 24 as it is secured tightly in place. Alternatively, the outer plates could be keyed to housing 18 via notches similar to 57. Should it be desirable to alter the spacing distance between the plates, disassembly is easily accomplished and outer ring members 60 and inner ring members 62 of different thicknesses may be inserted. The spacing, number and diameter of the plates can be varied to meet design requirements.

It has been observed that undesirable pressure and temperature conditions may develop within enclosed chamber 16 because of rotational friction or shearing forces, vibration, environmental effects, etc. In order to prevent damage to the sealed system, expansion chambers 67 are provided to accommodate volume and pressure variations in the electrorheological fluid used within enclosed chamber 16. The expansion chambers 67 in communication with chamber 16 may be configured and located as desired. As depicted generally in FIG. 1, chambers 67 are incorporated within internal magnet housing 36 to form an annular channel. Resilient tubing 68 is inserted within chambers 67 to expand or contract according to the volume or pressure conditions and occupies sufficient volume at atmospheric or low pressure to prevent air pockets from forming within chamber 16. Resilient members 67 may be constructed to include any suitable resilient elastomeric material, tubing, closed-cell foam, or other expandable material.

In the absence of an electric field, the drive elements of device 10 are decoupled except for the viscous drag of the ER fluid within chamber 16 acting on interspaced inner plates 56 and outer plates 58. The viscous drag may be kept to a minimum by using a low zero-field viscosity ER fluid. When an electric field is applied to the ER fluid within chamber 16 the ER fluid in the regions between inner and outer plates 56 and 58 solidifies, or develops a yield strength. The result is that the sleeve member 42 which is connected to inner plates 56, rotates with outer plates 58. The input and output drive elements are therefore coupled and the clutch or brake device 10 is engaged. The yield strength of the fluid may be altered by varying the strength of the electric field applied, which in turn will provide for variable torque transmission. The result is an infinitely variable clutch or brake mechanism in which the transmission or conversion of torque between drive elements may be easily selected and controlled.

The electric field necessary to develop and adjust the yield strength of the ER fluid within chamber 16 is provided by a voltage potential across inner and outer plates 56 and 58. The housing 18 operates as the ground electrode. The high voltage input is to center shaft 32 by lead 65, which conducts electricity through the sleeve member 42 to inner plates 56. Insulators 69 and 70 maintain the voltage potential and prevent short circuit between the conductive elements.

Figure 3:
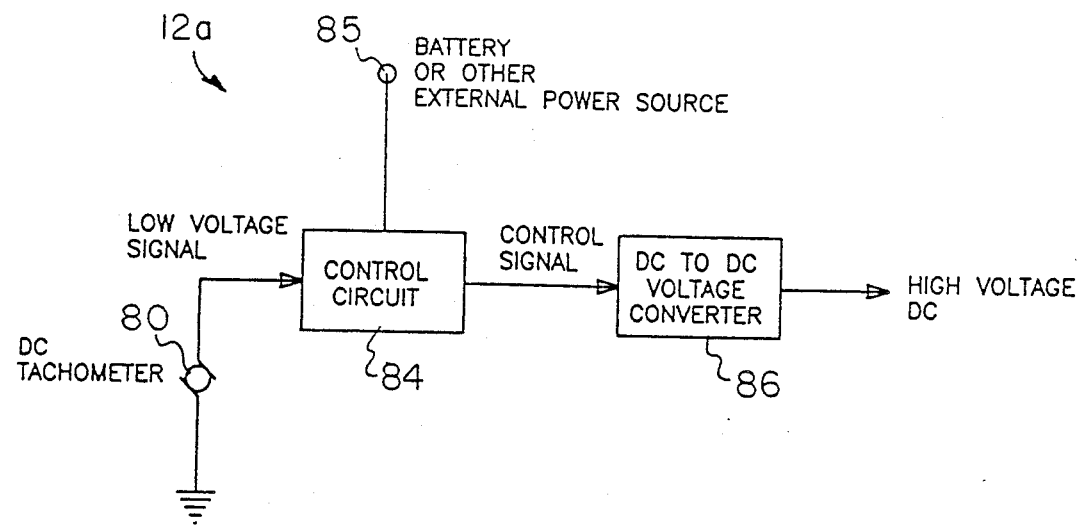
FIG. 3 is a schematic view of an electronic control assembly of the present invention.
Figure 4:
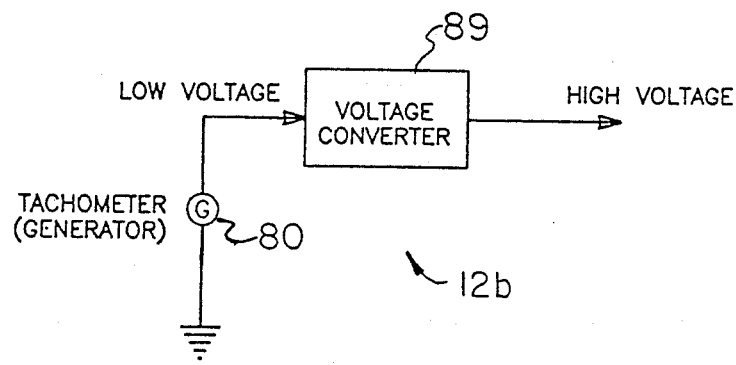
FIG. 4 is a schematic view of an electronic control assembly and self-contained power supply of the present invention.

Condition responsive control of torque transmission between the drive elements may be provided by the closed-loop feedback control systems 12a or 12b shown generally in FIGS. 3–4. A tachometer 72 (FIG. 1) directly measures the rotational speed of external magnet housing 38 and consequently outer shaft 30. It is contemplated that in dual shaft clutch arrangements, that tachometer 72 will measure the relative motion between the input and output elements. As shown in FIG. 1, head element Sensingcircuit 84 monitors instantaneously the motion condition of device 10. The tachometer 72 produces a low voltage signal proportional to speed. Control circuit 84, which is powered by an external power source 85, monitors the tachometer signal and produces a low voltage control signal which drives D.C. to D.C. converter 86. The control circuit 84 can be as simple as a threshold circuit which turns on the control voltage when the tachometer exceeds a set point. Control circuit 84 may also provide more elaborate control functions.

Closed loop feedback control of device 10 as described with reference to FIG. 3 may be modified to eliminate the need for an external power source for providing high voltage input to the system. As depicted in FIG. 4, control system 12b illustrates a self-powered arrangement. The tachometer 72 through shaft 80 converts mechanical to electrical energy yielding an A.C. or D.C. signal that is typically low voltage. The voltage converter 89 boosts the low voltage to a high voltage. In the case of an A.C. signal, the converter may be a simple, step-up transformer with the option of a rectifier on the output. A D.C. tachometer signal may be converted by a passive D.C. to D.C. voltage converter. The result is a high voltage output that increases in magnitude as the input voltage level or speed increases. The tachometer could also be constructed to produce the voltage directly. Typically, an input voltage of approximately 5–12 volts can be converted to a high voltage of approximately 1000–5000 volts. These parameters may be adjusted according to the requirements of the particular application.

It is also possible to make use of the periodic magnetic field produced by the rotation of the coupler magnets to generate a tachometer signal. A coil may be placed near the magnets, such that a periodic current is induced in the coil due to relative movement of the magnetic poles. The frequency of this signal is proportional to speed. As an alternative to a coil or inductor, a Hall effect sensor can be used to generate a signal proportional to speed.

Figure 6:
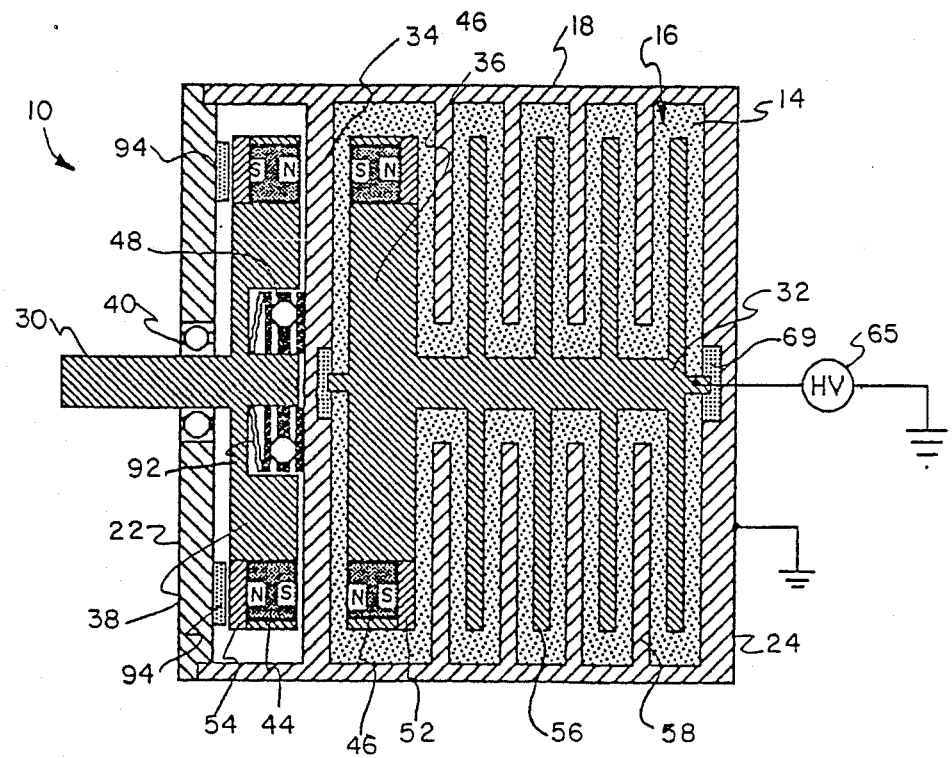
FIG. 6 is a somewhat schematic cross-sectional view of an alternative embodiment of the device shown in FIG. 1 having an external magnetic housing which is spring-biased to engage brake pads upon magnetic decoupling with the internal magnet housing.
Figure 7:
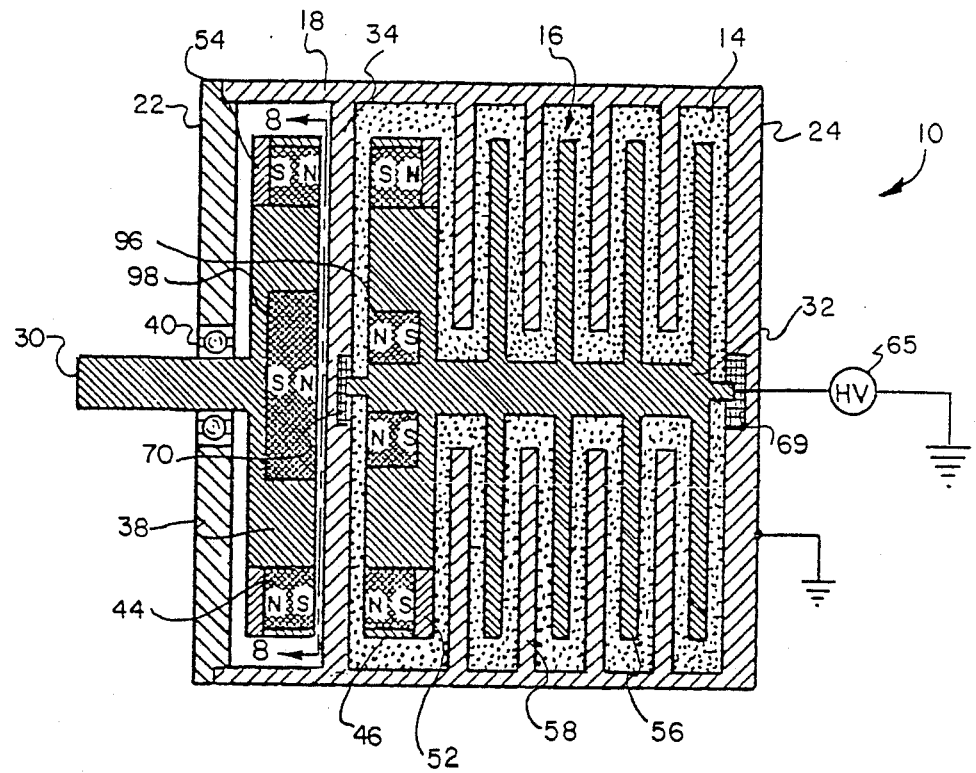
FIG. 7 is a somewhat cross-sectional view somewhat schematic view of an alternative embodiment of the device shown in FIG. 1.

FIGS. 6 and 7 illustrate somewhat schematically alternative arrangements for magnetic coupling between internal magnet housing 36 and external magnet housing 38. Inadvertent decoupling of the internal magnet housing 36 and external magnet housing 38 is a problem which can occur when unusually large loads or torque impulses are transmitted through the system. In order to prevent free rotation of the drive elements and simultaneously effect magnetic re-coupling, the brake system as depicted in FIG. 6 may be employed. During proper magnetic coupling of permanent magnet 44 and 46, the external magnet housing 38 rotates on outer thrust bearings 48 in close proximity to wall 34 due to the magnetic attraction. External magnetic housing 38 is further biased away from front plate 22 by spring member 92. Spring member 92 may be a Belleville disc spring or any other suitable biasing device. Upon disengagement or "slippage" of permanent magnets 44 and 46, external magnet housing 38 is forced by spring member 92 against brake pads 94. The expansion of the spring member 92 forcing external magnet housing 38 against brake pads 94 prevents external magnet housing 38 and outer shaft 30 from rotating freely, causing a braking effect. In addition to a fail-safe backup to avoid system problems or safety hazards that may result from decoupling, the resultant braking further facilitates re-engagement of permanent magnets 44 and 46 automatically as rotation speed decreases sufficiently. The braking system as described may be equally employed in alternative embodiments for both clutch and brake devices as would be apparent to those skilled in the art.

Figure 8:
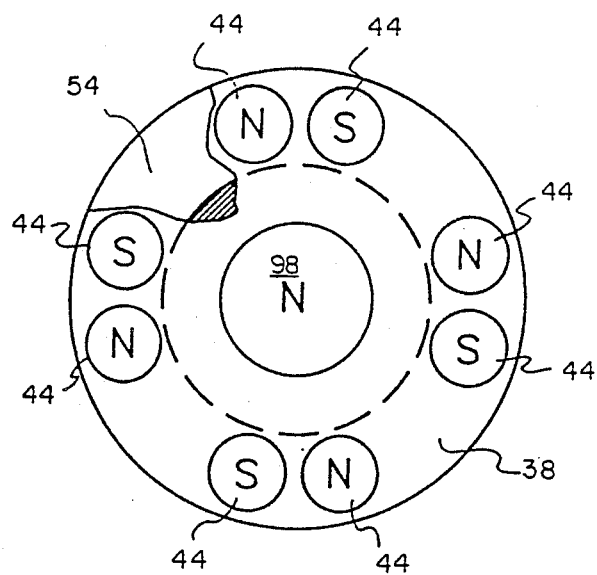
FIG. 8 is a somewhat schematic, partially broken away plan view, taken along line 8—8 of FIG. 7, showing a possible arrangement of permanent magnets and magnetic conductor material in the external magnet housing.

The strong attraction associated with magnetic coupling between permanent magnets 44 and 46 may cause forced engagement with wall 34 of internal magnet housing 36 and external magnet housing 38 during rotational motion. The unacceptable friction or drag experienced during rotation may be somewhat minimized by the used of repulsive magnets as shown in FIG. 7 and 8. A plurality of repulsive magnets 96 are positioned about the central axis of internal magnet housing 36. A corresponding repulsive magnet 98 is position centrally within external magnet housing 38. The repulsive forces therebetween magnets 96 and 98 reduce the frictional interface between internal magnet housing 36 and external magnet housing 38 and with wall 34. The repulsive forces only reduce the strong axial attraction caused by magnets 44 and 46, and do not affect the torque coupling. The repulsive forces are not sufficient to cause decoupling of permanent magnets 44 and 46, required for proper operation of device 10.

Figure 9:
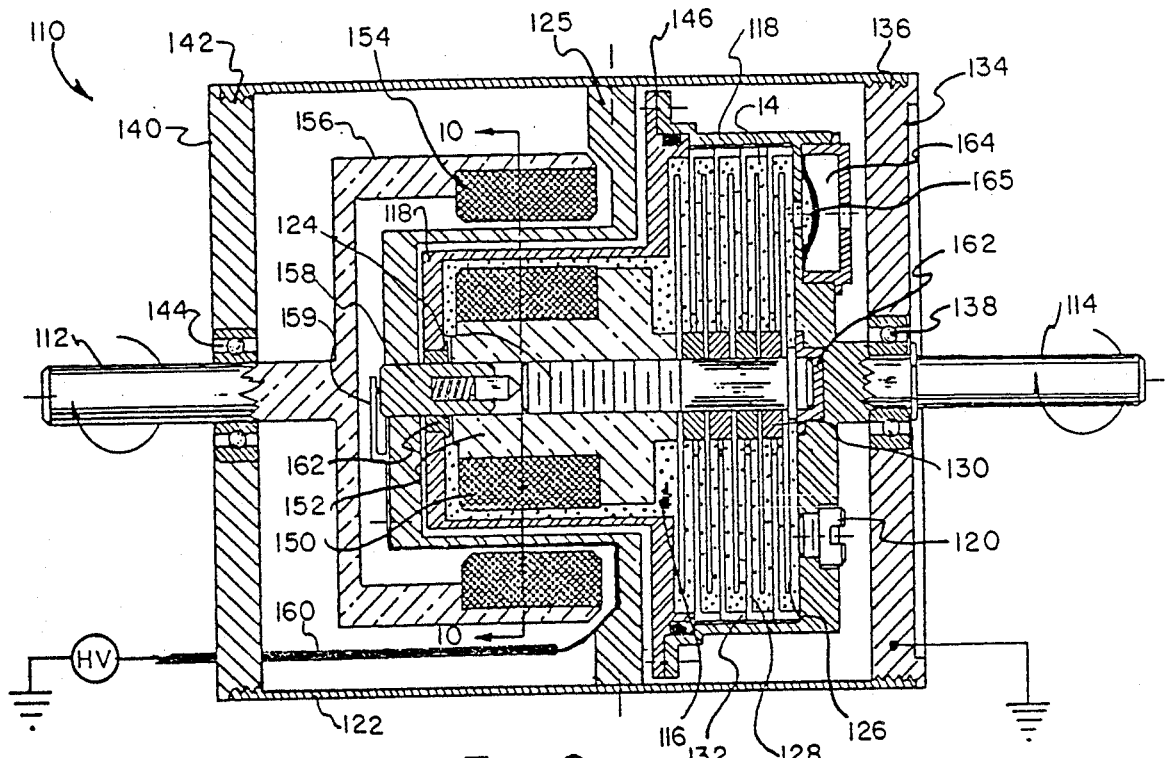
FIG. 9 is a partial cross sectional side elevation view of an alternative embodiment of an electrorheological fluid torque transmission and conversion device of the present invention having an annular magnetic coupling arrangement.
Figure 10:
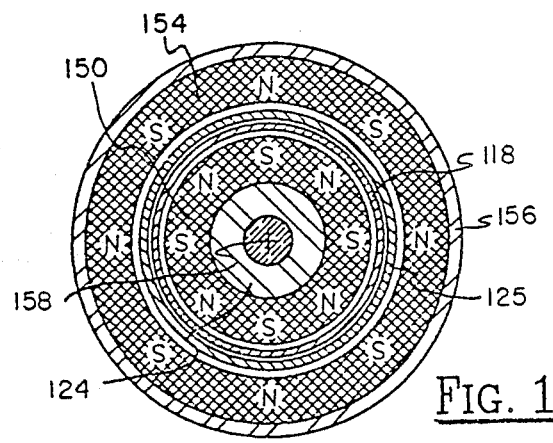
FIG. 10 is a reduced, somewhat schematic cross-sectional view taken along line 10—10 of FIG. 9 showing the orientation of the inner and outer annular permanent magnets.

Referring now to FIGS. 9 and 10, there is depicted an alternative embodiment for a torque transmission and conversion device of the present invention. Device 110 is shown as a dual shaft clutch; however, the principles discussed may well be employed in a variety of clutch or brake applications. Torque transmission occurs between first shaft 112 and second shaft 114, each of which may be interchangeably used for input or output of mechanical rotational energy. Enclosed chamber 116 for containing the electrorheological fluid is defined by casing 118. Fill port 120 is included within casing 118 for addition or removal of fluid to chamber 116. Enclosed chamber 116 is operably connected to and rotates with second shaft 114, and is further supported within housing 122 of device 110 on center shaft 124. Housing 122 generally supports and protects the components of device 110 therein. A housing wall 125 supports center shaft 124 about the axis of rotation.

Coupling between the drive elements occurs by the gripping or yield stress developed by the electrorheological fluid 14 within enclosed chamber 116 between the inner plates 126 and outer plates 128. The outer plates are secured to enclosed chamber 116 and rotate therewith. They are alternately interspaced with the inner plates 126, which are secured to center shaft 124. Inner and outer plates 126 and 128 are interspaced in a manner as previously mentioned with reference to FIG. 2. The inner plates 126 are spaced apart by inner rings 130. Outer plates 128 are interspaced by outer rings 132. As previously mentioned, inner and outer rings 130 and 132 may be easily removed and replaced to adjust the spacing. In the case of device 110, removal of the enclosed chamber 116 is gained by removing back plate 134 of housing 122. Back plate 134 may be secured to housing 122 by mating threads 136. Second shaft 114 extends through back plate 134 and rotates freely by engagement with rotational bearings 138. Similarly, access may be gained to housing 122 through front plate 140. Front plate 140 is removably secured to housing 122 by mating threads 142. Rotational bearings 144 facilitate free rotation of first shaft 112. During assembly or spacing adjustment of inner and outer plates 126 and 128, enclosed chamber 116 once removed from housing 122 may be accessed by separation of casing 118 at mating surfaces 146. The casing may be secured at mating surfaces 146 by any suitable fastening means (not shown). Once casing 118 is secured in place, annular lip 148 compresses outer plates 128 and outer rings 132 in place.

Magnetic coupling of drive elements is utilized for device 110 so as to eliminate the need for a dynamic fluid seal between the ER fluid in enclosed chamber 116 and external moving parts. Multiple pole, annular magnets are functionally intersleeved and oppositely poled for attractive coupling in the manner illustrated in FIG. 10. Inner magnet 150 is disposed within enclosed chamber 116 and fastened to internal magnet housing 152. Internal magnet housing 152 is secured to and rotates with center shaft 124. Outer magnet 154 is secured to external magnet housing 156 and operatively connected to first shaft 112. Due to magnetic coupling between inner magnet 150 and outer magnet 154, internal magnet housing 152 and external magnet housing 156 rotate in unison, even though physically separated by housing wall 125 and casing 118. Casing 118 and housing wall 125 are magnetically of low permeability and of minimal thickness in the region of the permanent magnetic field interaction between inner and outer magnets 150 and 154.

It is contemplated that a close-loop feedback control system (not shown) as discussed previously with reference to FIGS. 1, 3 and 4 may be used to vary the torque transmission between first shaft 112 and second shaft 114 by application of an electric field to the electrorheological fluid. The electric field responsive to the particular control utilized is applied across the inner plates 126 and outer plates 128 to determine the yield strength and thus gripping effect between the plate members. Housing 122 serves as the ground electrode. The high voltage electrode is a spring biased, rotational contact point 158 which provides the high voltage potential to center shaft 124. High voltage is transmitted through pin 159 and insulated lead 160. Insulators 162 isolate the high voltage from ground electrode components.

Fluid expansion within enclosed chamber 116 caused by temperature and pressure conditions is accommodated in a manner similar to that discussed previously, by expansion chamber 164. Expansion chamber 164 includes a resilient member 165 which may be constructed of a metal, elastomeric or other material. As shown, expansion chamber 164 is a flexible diaphragm which permits expansion of fluid therein. At atmospheric pressure, enclosed chamber 116 remains free of undesirable air pockets.

Figure 11:
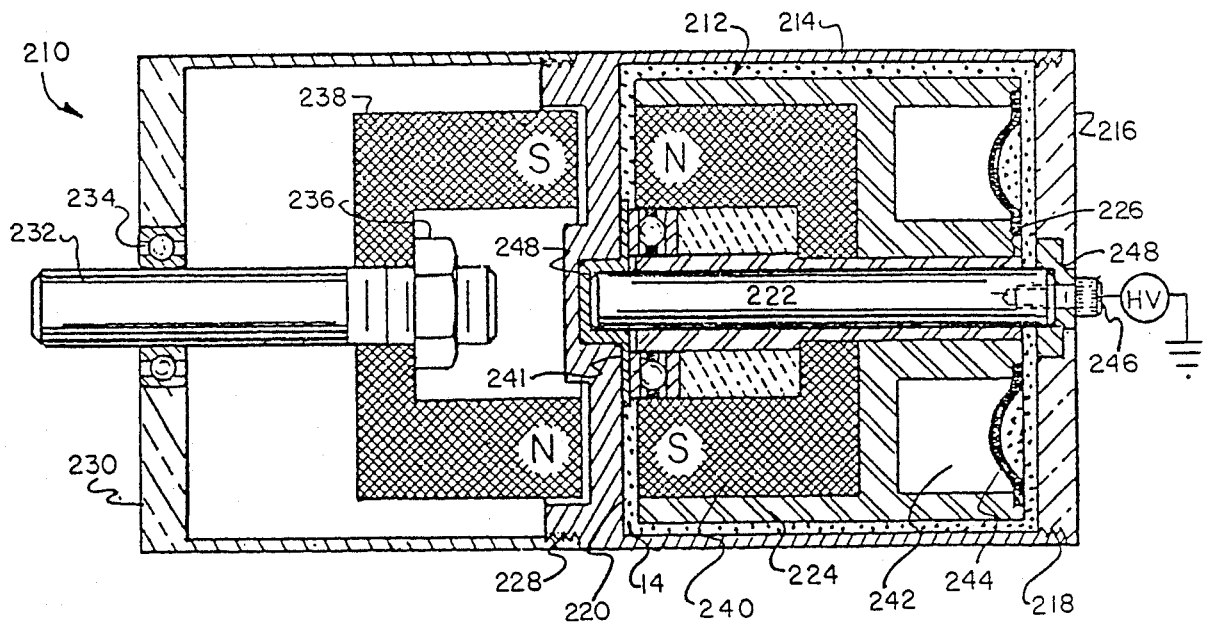
FIG. 11 is a partially broken away somewhat schematic side elevation view of an alternative embodiment of an electrorheological fluid torque transmission and conversion device of the present invention have opposing, multiple pole permanent magnets.
Figure 12:
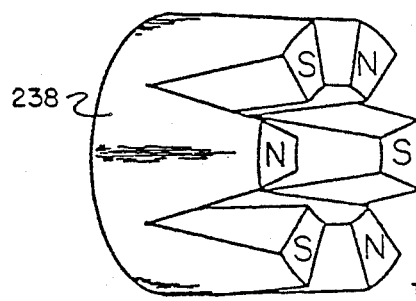
FIG. 12 is a somewhat schematic side perspective view of a multiple pole permanent magnet of the type which may be used in the device shown in FIG. 11.

Referring now to FIGS. 11 and 12, there is shown somewhat schematically another embodiment of the present invention showing opposing, multiple pole permanent magnets to accomplish magnetic coupling for a torque transmission and conversion device 210. Device 210 includes an enclosed chamber 212 for containing electrorheological fluid, conceptually represented by particles 14, without the need for a dynamic fluid seal. Enclosed chamber 212 is partially formed by housing 214 of device 210 and back plate 216. Back plate 216 is secured to the housing 214 by mating threads 218. Front wall 220 of enclosed chamber 212 may be formed contiguously with housing 214, as shown. Supported between backplate 216 and front wall 212 is center shaft 222 for support of the rotating components of the system within enclosed chamber 214. An internal magnet housing 224 is operably connected to spindle 226 for rotation about center shaft 222. Engaged to housing 214 by mating threads 228 is outer housing 230. Outer housing 230 supports load bearing outer shaft 232 for rotational movement along the central axis of device 210. Rotation is facilitated by bearings 234. Supported on outer shaft 232 by fastening nut 236 is a permanent, multiple pole outer magnet 238. Outer magnet 238 is oriented in the proximity of front wall 220 to effect magnetic coupling with a similar, corresponding inner magnet 240. Inner magnet 240 is operatively connected to the internal magnet housing 224. Outer magnet 238 and inner magnet 240 rotate in unison due to the permanent magnetic coupling through front wall 220 therebetween. Thrust bearings 241 facilitate free rotation across the surface of wall 220.

As depicted in FIG. 11, device 210 operates as a single shaft brake mechanism, it being understood that the principles of the invention may be applied to dual drive element clutch arrangements as well. Viscous coupling within an enclosed chamber 212 is accomplished by the application of an electric field to the electrorheological fluid therein between outer housing 230 and internal magnet housing 224. Fluid expansion chambers 242 are also included within internal magnet housing 224 to accommodate fluid volume variations caused by operation conditions. The expansion element 244 may be constructed of any suitably resilient material.

Control of torque transmission for device 210 may be accomplished in the same manner as described with reference to FIGS. 1, 3, and 4, previously discussed. The electric field potential between internal magnet housing 224 and outer housing 230 is accomplished by the input of high voltage through electrode 246 to the center shaft 222. The outer housing serves as the ground electrode. Insulating members 248 are provided to maintain the electric potential between the high voltage and ground electrode. The multiple pole, opposing magnet arrangement as depicted in FIGS. 11 and 12 is particularly well suited for low cost, simplified assembly, disassembly and manufacturability. Permanent magnet coupling of appreciable magnitude can be obtained for a wide variety of applications.

Figure 13:
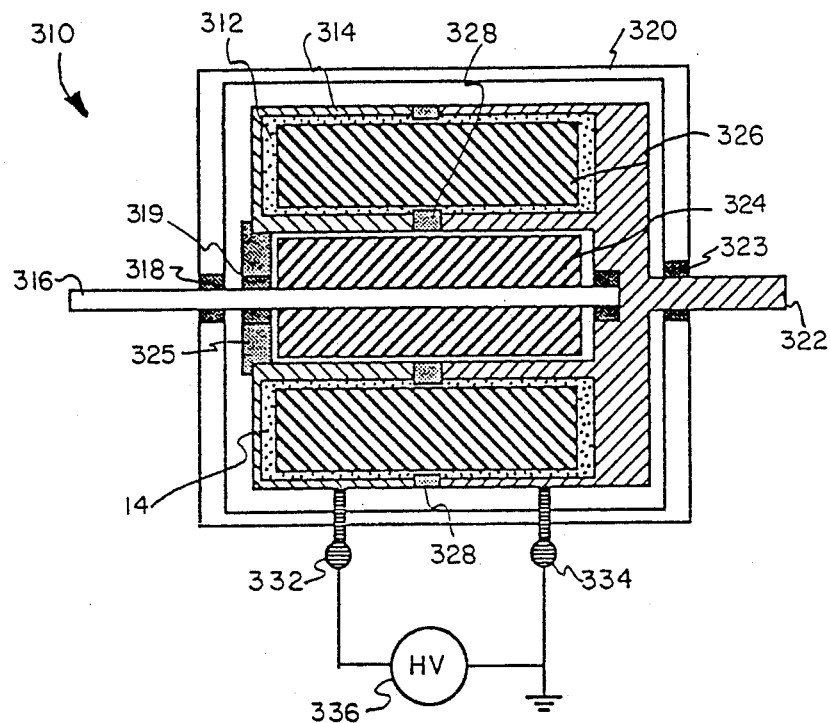
FIG. 13 is a somewhat schematic cross-sectional side elevation view of an alternative embodiment for an electrorheological fluid torque transmission and conversion device having a floating electrode arrangement.
Figure 14:
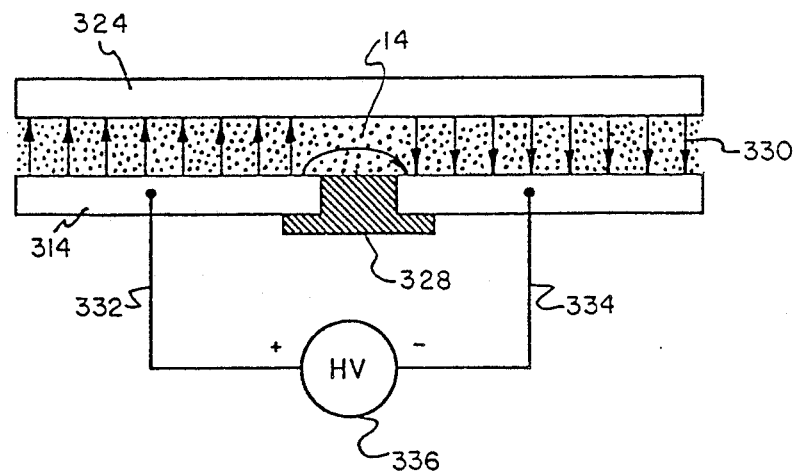
FIG. 14 is a schematic view which illustrates electric field lines characteristic of a floating electrode arrangement similar to the embodiment of the invention shown in FIG. 13.

The elimination of the need for direct electrical connection to opposing drive elements within the electrorheological fluid may be desirable according to the present invention to provide a system of enhanced reliability and simplicity in construction. Depicted in FIGS. 13 and 14 are somewhat schematic illustrations of a torque transmission and conversion device 310 having a floating electrode. An enclosed chamber 312 which contains electrorheological fluid is incorporated within casing 314. Casing 314 is operably connected to a first shaft 316 for input or output of mechanical rotational energy. First shaft 316 is supported on bearings 318 and 319 by housing 320. Housing 320 also supports second shaft 322. Second shaft 322 supported on bearings 323 may be utilized for either input or output of mechanical rotational energy. Either of first shaft 316 or second shaft 322 may be fixed stationary for a brake application. Operably connected to second shaft 322 is a multiple pole, permanent inner magnet 324. An annular, multiple pole permanent outer magnet 326 is disposed within enclosed chamber 312 and rotates in unison with inner magnet 324. Inner magnet 324 is further secured in place on shift 322 by spacer 325. Transmission of torque between first shaft 316 and second shaft 322 occurs by the gripping effect of the ER fluid between casing 314 and outer magnet 326.

The electric field required to vary the yield stress of the electrorheological fluid is provided by capacitively coupling the outer magnet through the electrorheological fluid to the casing 314. The outer magnet acts as a floating electrode in the manner schematically illustrated in FIG. 14. A voltage potential is provided across opposing portions of casing 314 separated by insulators 328. The outer magnet 326 acts as a floating electrode to transmit the electric field across the electrorheological fluid as shown by field lines 330. Thus, instead of having to make direct electrical connections to electrodes on both sides of the electrorheological fluid, it is possible to place both connections on the same side of the fluid and permit the opposing electrode to remain free of direct electrical connection. A resulting phenomena is that the applied voltage to created a given electric field in the gap is increased. The floating electrode arrangement may be applied under circumstances where it is not convenient or possible to make direct electrical connections to one of the electrodes, such as in the clutch device 310 shown herein. Brush or direct connections 332 and 334 are shown for supply of high voltage from power source 336.

It can be seen from the foregoing that the present invention provides electrorheological torque transmission and conversion systems which are of a reliable, performance-oriented and relatively inexpensive construction, and are readily adaptable to a wide variety of clutch or brake applications. Due to the unique use of magnetic coupling between the drive elements, the need for a dynamic fluid seal between the electrorheological fluid chamber and external drive elements has been eliminated. The ability to isolate magnetically or electrically drive elements within the enclosed chamber for containing electrorheological fluid has resulted in reliable, maintenance free systems.

While preferred embodiments of the present invention have been described in detail, they are used in a generic and descriptive sense only and not for purposes of limitation; various modifications, alterations and changes may be made without departing from the spirit and scope of the present invention as defined in the appended claims.

What is claimed is:

1. Apparatus for transmission and conversion of torque responsive to selective and variable application of an electric field to an electrorheological fluid, comprising:

an enclosed chamber containing the electrorheological fluid;

a first member structurally isolated within said enclosed chamber and movable relative to said enclosed chamber, through which torque may be transmitted by the electrorheological fluid responsive to the particular yield strength thereof determined by the magnitude of the electric field;

a second member positioned externally from said enclosed chamber in close proximity to a surface of said enclosed chamber; and, drive magnet means and output magnet means associated respectively with each of said first member and said second member for operatively coupling said first member to said second member through said surface of said enclosed chamber such that said first member and said second member rotate together.

2. The apparatus according to claim 1, further comprising:

a plurality of outer disc elements connected to said enclosed chamber; and, a plurality of inner disc elements connected to said first member, such that said outer disc elements and said inner disc elements are alternately interspaced within said enclosed chamber for maximizing the electrorheological fluid contact surface area associated with each of said enclosed chamber and said first member for torque transmission therebetween by the electrorheological fluid.

3. The apparatus according to claim 2 wherein:
said inner disc elements and said outer disc elements are respectively interspaced a selected distance axially by inner and outer ring members.

4. The apparatus according to claim 1 wherein:
said enclosed chamber includes resilient fluid expansion means for preventing fluid pressure build-up within said enclosed chamber caused by heating of the electrorheological fluid.

5. The apparatus according to claim 1 further comprising:
brake means for preventing free rotation of said first member relative to said second member upon magnetic decoupling of said drive magnet means and said output magnet means.

6. The apparatus according to claim 5 wherein:
said second member is spring biased for contact with a friction surface upon said magnetic decoupling.

7. The apparatus according to claim 1 further comprising:
electric field generating means for providing a controllable and variable voltage potential across the electrorheological fluid, including said electric field generating means includes variable speed transducer means operatively connected to one of said first member or said second member for producing a control signal proportional to rotational speed of said first member relative to said enclosed chamber.

8. The apparatus according to claim 7 wherein:
said variable speed transducer means produces the power required for establishing the voltage potential across the electrorheological fluid.

9. The apparatus according to claim 1 further comprising:
tachometer means for generating a signal proportional to the rotational speed of said drive magnet means and output magnet means.

10. Apparatus for transmission and conversion of torque responsive to selective and variable application of an electrical field to an electrorheological fluid, comprising:
a first member for containing the electrorheological fluid;
a second member structurally isolated within said first member and operatively positioned for movement relative to said first member such that torque may be transmitted alternately between said first member and said second member responsive to intercoupling thereof by the electrorheological fluid in accordance with the particular yield strength of the electrorheological fluid produced by the electric field;
electric field generating means for providing a controllable and variable voltage potential between said first member and said second member by converting mechanical energy associated with the torque into electric energy.

11. The apparatus according to claim 10 wherein: said electric field generating means includes a generator which is mechanically driven by said second member.

12. A system for condition responsive control of torque transmission and conversion between drive elements, comprising:
an electrorheological fluid clutch assembly for providing variable transmission of torque between the drive elements responsive to yield strength developed in an electrorheological fluid by application of an electric field to said electrorheological fluid;
transducer means operatively coupled to said ER fluid clutch assembly for converting motion between said drive elements to an electrical signal;
control means for processing said electrical signal and selecting the magnitude of said electric field to be applied to said electrorheological fluid; and
power means for supplying a high voltage potential necessary for providing the selected electric field to said electrorheological fluid, said power means comprising a generator which converts mechanical rotational energy of said electrorheological fluid clutch assembly into high voltage potential.

13. Apparatus for transmission and conversion of torque responsive to selective and variable application of an electric field to an electrorheological fluid, comprising:
an enclosed chamber containing the electrorheological fluid, said enclosed chamber including at least one interface surface;
a first member structurally isolated within said enclosed chamber and positioned within and moveable relative to said enclosed chamber, such that torque may be transmitted alternately between said enclosed chamber and said first member responsive to intercoupling thereof by the electrorheological fluid in accordance with the particular yield strength of the electrorheological fluid produced by the electric field;
a second member positioned externally from said enclosed chamber in proximity to said interface surface;
an internal magnet housing operatively connected to said first member within said enclosed chamber and having a plurality of permanent magnets associated therewith;
an external magnet housing operatively connected to said second member and having a plurality of permanent magnets associated therewith, said external magnet housing being positioned in sufficiently close proximity to said internal magnet housing such that said internal magnet housing and said external magnet housing become magnetically coupled through said interface surface.

14. The apparatus according to claim 13 wherein: said plurality of permanent magnets are spaced about the radial perimeter of each of said internal magnet housing and said external magnet housing.

15. The apparatus according to claim 13 wherein: said plurality of permanent magnets are positioned about the radial perimeter of said internal magnet housing and said external magnet housing in groups of two or more for enhancing magnetic field strength in conjunction with magnetically conductive portions thereof.

16. The apparatus according to claim 13 wherein: said external magnet housing and said internal magnet housing each include about their central axis of rotation repulsive magnets for minimizing rotational friction of said first member and said second member caused by attraction of said permanent magnets of each of said internal magnet housing and said external magnet housing.

17. Apparatus for transmission and conversion of torque responsive to selective and variable application of an electric field to an electrorheological fluid, comprising:

an enclosed chamber containing the electrorheological fluid;

a first member structurally isolated within said enclosed chamber and movable relative to said enclosed chamber through which torque may be transmitted by the electrorheological fluid responsive to the particular yield strength thereof determined by the magnitude of the electric field;

a second member positioned externally from said enclosed chamber in close proximity to a surface of said enclosed chamber;

drive magnet means connected to said first member including a multiple pole permanent magnet;

output magnet means connected to said second member including a multiple pole annular permanent magnet;

said drive magnet means and said output means operatively coupling said first member to said second member through said surface such that said first member and said second member rotate together.

18. The apparatus according to claim 17 wherein: said output magnet means and said input magnet means are axially spaced having said surface therebetween.

19. The apparatus according to claim 17 wherein: said output magnet means and said input magnet means are intersleeved having said surface therebetween.

20. Apparatus for transmission and conversion of torque responsive to selective and variable application of an electric field to an electrorheological fluid, comprising:

a first member for containing the electrorheological fluid having a plurality of first disc elements axially spaced therein for increasing the operative contact surface area of said first member to said electrorheological fluid;

a second member structurally isolated within said first member for movement relative thereto having a plurality of second disc elements axially spaced thereon for increasing the operative contact surface area of said second member to the electrorheological fluid, said first disc elements and said second disc elements being alternately interspaced such that torque may be transmitted between said first member and said second member by said first disc elements and said second disc elements responsive to intercoupling thereof by the electrorheological fluid in accordance with the particular yield strength therebetween of the electrorheological fluid produced by the electric field; and, inner and outer ring members for exchangeably interspacing each of said first disc elements and said second disc elements axially one from another a selected distance apart.

21. Apparatus for transmission and conversion of torque to an output responsive to selective and variable application of an electric field to an electrorheological fluid, comprising:

a first member forming an enclosed chamber having a inner diameter wall and containing the electrorheological fluid;

an annular drive magnet positioned within said enclosed chamber and movable relative to said first member such that torque may be transmitted alternately between said first member and said second member responsive to intercoupling thereof by the electrorheological fluid in accordance with the particular yield strength thereof produced by said electric field;

a cylindrical output magnet operatively coupled to said output and positioned relative to said drive magnet such that said output magnet and said drive magnet are magnetically coupled through said inner diameter wall; and, said first member being bisected electrically by insulator means and having an applied voltage potential such that said annular drive magnet is capacitively coupled through the electrorheological fluid to said first member.

22. A method for the transmission and conversion of torque to an output using an electrorheological fluid responsive to selected and variable application of an electric field thereto, comprising the steps of:

providing a first member which forms an enclosed chamber containing electrorheological fluid;

providing a second member within said enclosed chamber which is movable relative to said first member such that torque may be transmitted between said first member and said second member responsive to intercoupling thereof by said electrorheological fluid in accordance with the particular yield strength of said electrorheological fluid produced by the electric field;

isolating said second member structurally within said first member; and providing indirect coupling of said second member to said output by a permanent magnetic field.

23. The method according to claim 22 further comprising the step of:

providing the voltage potential necessary to establish said electric field by converting mechanical energy associated with said torque into electrical energy.

24. The method according to claim 22 further comprising the steps of:

providing a plurality of first disc elements operatively connected to said first member to establish additional contact surface area of said first member to said electrorheological fluid;

providing plurality of second disc elements operatively connected to said second member establish additional contact surface area of said second member to said electrorheological fluid; and, interspacing alternately said first disc elements and said second disc elements a selected distance axially one from another by annular ring members positioned therebetween.

25. A method for constructing an electrorheological fluid clutch or brake assembly, comprising the steps of:

providing a first member which forms an enclosed chamber containing the electrorheological fluid;

providing a second member within said enclosed chamber which is movable relative to said first member such that torque may be transmitted between said first member and said second member responsive to intercoupling thereof by the electrorheological fluid in accordance with the particular yield strength of the electrorheological fluid;

providing a variable electric potential between said first member and said second member to vary the yield strength of the electrorheological fluid;

providing outer disc members connected to said first member for increasing the contact surface area thereof with the electrorheological fluid;

interspacing said outer disc members with removeable outer ring members having a desired thickness which may be varied to select the spacing distance between said outer disc members;

providing inner disc members connected to said second member for increasing the contact surface area thereof with the electrorheological fluid;
interspacing said inner disc members with removable inner ring members having a desired thickness which may be varied to select the spacing distance between said inner disc members.

* * * * *